United States Patent [19]

Himuro et al.

[11] 4,228,473

[45] Oct. 14, 1980

[54] PICK-UP DEVICE FOR MAGNETICALLY RECORDED INFORMATION AND METHOD AND SYSTEM FOR USING SAME

[75] Inventors: Masami Himuro, Tokyo; Toshiro Yamada, Kamakura; Yoshimi Makino, Yokohama, all of Japan

[73] Assignee: Sony Corporation, Tokyo, Japan

[21] Appl. No.: 952,663

[22] Filed: Oct. 19, 1978

[30] Foreign Application Priority Data

Oct. 20, 1977 [JP] Japan .................. 52-126193

[51] Int. Cl.[2] .................. G11B 5/32; G11B 7/02; G11C 11/14; G11C 11/42
[52] U.S. Cl. .................. 360/114; 350/151; 365/10; 360/113
[58] Field of Search .................. 360/114, 55, 113; 365/2, 8–10, 64, 215; 350/151

[56] References Cited

U.S. PATENT DOCUMENTS

| | | | |
|---|---|---|---|
| 3,626,394 | 12/1971 | Nelson et al. | 360/114 |
| 3,636,535 | 1/1972 | Cusher et al. | 360/114 |
| 3,676,867 | 7/1972 | Bacon et al. | 360/114 |
| 3,688,282 | 8/1972 | Buhrer | 365/10 |
| 3,859,643 | 1/1975 | Borrelli | 365/10 |
| 3,893,023 | 7/1975 | Otala | 365/10 |
| 4,037,263 | 7/1977 | Moeckel | 360/114 |
| 4,052,747 | 12/1977 | Roos | 360/110 |

*Primary Examiner*—Alfred H. Eddleman
*Attorney, Agent, or Firm*—Lewis H. Eslinger; Alvin Sinderbrand

[57] ABSTRACT

A pick-up device for reading out information which has been recorded on a magnetic medium. The device comprises a substrate and a layer of soft magnetic material overlying a surface of the substrate, the easy axis or direction of magnetization being normal to the surface and the magnetic material having properties capable of having magnetic bubble domains generated and propagated therein, so that when the pick-up device is used to read out information from a magnetic medium, patterns of magnetic domains are formed in the layer of magnetic material corresponding to the patterns of the recorded information. Although the magnetic material is of the type capable of having magnetic bubble domains generated and propagated therein, there is no need to provide the usual bias field for maintaining the bubble domains or for providing domain-transport or domain-annihilating fields. In one use of the pick-up device, light is transmitted through the substrate and through the layer of magnetic material to be reflected from a layer of light-reflective material back through the magnetic material and the substrate, whereby the polarization of the reflected light is rotated, relative to the polarization of the transmitted light, by an amount determined by the patterns of magnetic domains formed in the layer of magnetic material. Hence, the recorded information can be optically read from the magnetic medium. In another use of this device, a magnetoresistive head is disposed on the substrate, the resistance of this magnetoresistive head being varied as a function of the patterns of magnetic domains formed in the layer of magnetic material.

28 Claims, 8 Drawing Figures

PICK-UP DEVICE FOR MAGNETICALLY RECORDED INFORMATION AND METHOD AND SYSTEM FOR USING SAME

BACKGROUND OF THE INVENTION

This invention relates to a pick-up device for reading out information which has been recorded on a magnetic medium and, more particularly, to such a pick-up device which is capable of reading out information from the medium regardless of whether that medium is stationary or is moving. This invention is further directed to a method and an apparatus for using that pick-up device for enabling magnetically recorded information to be optically read out.

Typical magnetic reproducing, or playback, apparatus which is used to reproduce information which has been recorded on a magnetic medium, such as magnetic tape, includes a magnetic transducer, or head, which is used to produce electrical signals corresponding to the magnetically recorded patterns which represent the information. A conventional type of playback head is a ring-type head which, normally, is not responsive to a magnetic field. This means that, in order for this head to reproduce the information which is recorded on the magnetic medium, there must be movement between the head and medium. Furthermore, in order to obtain a desirably high signal-to-noise (S/N) ratio, the width of the track in which the information is recorded on the magnetic medium must be relatively wide, that is, on the order of more than about 30 microns, ($\mu$m). Because of this wide track width, the recording density is significantly limited. Hence, when the ring-type magnetic head is used to reproduce video signals from a magnetic medium, wide track widths must be recorded, thus resulting in a relatively inefficient use of that medium for video recording.

A magnetic head which is sensitive to the magnetic field or magnetic flux generated by information recorded on a magnetic medium has been proposed. However, such a head requires AC biasing for its operation. This means that a biasing coil and an oscillator must be provided. This often presents difficulties in assembling and constructing magnetic playback apparatus. Furthermore, the maximum frequency which can be reproduced by such a head is limited by the frequency of the biasing signal supplied thereto.

Another type of magnetic head which is responsive to the magnetic flux generated by information recorded on the magnetic medium includes a Hall-effect element. While this type of head advantageously can read out signals while the magnetic medium is stationary, the response of this head is temperature-sensitive because the Hall-effect elements are constructed of semiconductor material.

Yet another type of magnetic playback head is comprised of a combination of a magnetoresistive element and a ring-type head. The resistance of the magnetoresistive element varies as a function of the magnetic field generated by the signals recorded on the magnetic medium. However, since the ring-type head is used, the aforenoted problem of relatively low recording density caused by a track width on the order of at least 30 $\mu$m is present.

It is known that a magnetic field will affect a light beam. The Kerr effect produces a rotation of the polarization of polarized light which is reflected from the surface of a magnetized substance. The Faraday effect produces a rotation of the polarization of polarized light which is transmitted through a magnetic substance. It may be thought, therefore, that if a polarized light beam is transmitted to a magnetic medium upon which information is recorded, then the polarization of the light beam which is reflected from that medium can be detected so as to sense rotations therein and thereby decode the recorded information. However, a typical magnetic medium, such as conventional magnetic tape, has an uneven reflecting surface. Consequently, the reflected light beam cannot be detected accurately and, moreover, generally is accompanied by substantial noise signals. Hence, the Kerr effect is impractical to read out magnetically recorded information directly.

One embodiment for utilizing the Faraday effect to read out information from magnetic tape is described in Japanese Patent Publication No. 5483/63. In this apparatus, signal information is recorded by conforming the magnetic domains in a film of hard magnetic semiconductor crystal to desired information patterns. However, this requires a specific type of magnetic medium for recording and, additionally, a special type of read-out system must be used. The information is recorded as a stripe pattern of magnetic domains in the film, and these patterns are detected by transmitting polarized red light through the film and onto a slit. An analyzer positioned behind the slit senses the variations of the polarization due to the Faraday effect in accordance with the magnetic domain stripe pattern. The film generally is on the order of less than 1 $\mu$m in thickness; and this significantly limits the applications and usefulness of this type of apparatus. The read-out apparatus described in this publication cannot be used to reproduce the information which is recorded on conventional magnetic media now in general use.

Although the Kerr effect is not practical for use in the direct optical read-out of magnetically recorded information from the magnetic medium per se, a pick-up device may be used in order to adopt the Kerr effect for information read-out. A layer of soft magnetic material, such as permalloy, having its easy axis parallel to the plane of the layer can be mounted on a magnetic medium. The information which is recorded on the magnetic medium is transferred onto the permalloy layer so that when a polarized light beam is focused onto the permalloy layer and is reflected therefrom, the angle of rotation of the polarization can be detected and used to decode the magnetically recorded information. However, the use of permalloy provides relatively poor contrast in detecting the recorded information. Furthermore, the angle by which the polarized light is rotated is very small, such as on the order of about 20 minutes, with the result that the read-out signal has an inferior signal-to-noise ratio.

An improvement in the contrast and signal-to-noise ratio of the read-out signal is obtained if a layer of semi-hard magnetic material having its easy axis normal to the plane of the layer is used as the magnetic transfer medium. One example of such material is an amorphous GdFe film. When this film is brought into contact with the magnetic medium, a magnetic domain pattern is formed in the film corresponding to the recorded pattern in the magnetic medium. This "printed" pattern in the film then can be read by using the Kerr effect. However, and as described in the article "Amorphous GdFe Film Observable with High Contrast by Transferring Magnetic Record Pattern", published in Nikkei Electronics, Jan. 24, 1977, pages 35–37, this technique requires that the GdFe film be demagnetized, or erased, prior to each use thereof to print the recorded magnetic pattern. Also, when printing the information which is magnetically recorded on the magnetic medium, both the medium and GdFe film must be stationary. Consequently, if this film is to be used for reading out the information recorded on magnetic tape, the tape must be stopped, the film then must be brought into contact therewith, the induced magnetic patterns in the film then must be read, and then the film must be erased while the tape is advanced so that the next area can be printed.

Another type of system which has been proposed for reading out magnetically recorded information is described in U.S. Pat. No. 4,052,747. That system uses a magnetic bubble domain device for generating bubble domains in response to the magnetic patterns which are recorded on the magnetic medium. However, when a bubble domain device is used in this system, a domain transport source must be provided to shift the bubble domains through the device and, also, a bias field is necessary to stabilize the bubble domains and a bubble domain annihilator must be provided to erase the device following each reading operation. This results in a relatively complex and impractical read-out system.

OBJECTS OF THE INVENTION

Therefore, it is an object of the present invention to provide an improved pick-up device for reading out information which has been recorded on a magnetic medium.

Another object of this invention is to provide an improved pick-up device which can be used to read information which has been recorded with a relatively high density in, for example, narrow recording tracks.

A further object of this invention is to provide an improved pick-up device for reading magnetically recorded information whether or not the magnetic medium upon which the information is recorded is moving or is stationary.

An additional object of this invention is to provide an improved pick-up device for reading out magnetically recorded information with a high signal-to-noise ratio.

Yet another object of this invention is to provide a pick-up device for reading out magnetically recorded information, which device eliminates the need for a bias field source, a magnetic domain transport source or a magnetic domain annihilator, or demagnetizing, device.

A still further object of this invention is to provide an improved pick-up device which is responsive to the magnetic field of magnetically recorded information.

Another object of this invention is to provide a pick-up device for reading out magnetically recorded information, together with a method and system for using that device, and particularly, for employing the Faraday effect with that device so as to optically read out the magnetically recorded information.

Still another object of this invention is to provide an improved pick-up device for reading out magnetically recorded information, which device can be used in conjunction with optical read-out techniques or with a magnetoresistive element for reproducing the recorded information.

Various other objects, advantages and features of the present invention will become readily apparent from the ensuing detailed description, and the novel features will be particularly pointed out in the appended claims.

SUMMARY OF THE INVENTION

In accordance with this invention, a pick-up device is provided for reading out information which has been recorded on a magnetic medium. The device comprises a substrate and a layer of soft magnetic material overlying a surface of the substrate, the easy axis of the magnetic material being normal to the surface, and the magnetic material having properties capable of having magnetic bubble domains generated and propagated therein so that when the pick-up device is used to read out information from a magnetic medium, patterns of magnetic domains are formed in the layer of magnetic material corresponding to the patterns of the recorded information. In one embodiment, the pick-up device is used in conjunction with optical read-out techniques wherein a polarized light beam is transmitted through the layer of magnetic material to be reflected by a layer of light-reflective material overlying the magnetic material back through the magnetic material such that the polarization of the reflected light beam is rotated relative to the polarization of the transmitted light beam as a function of the patterns of magnetic domains formed in the magnetic material.

In accordance with another embodiment of this invention, a magnetoresistive head is provided on the substrate such that the resistance of that head is varied as a function of the patterns of magnetic domains formed in the layer of magnetic material. This invention also is directed to a method and system for using the pick-up device for optically reading out the magnetically recorded information.

BRIEF DESCRIPTION OF THE DRAWINGS

The following detailed description, given by way of example, will best be understood in conjunction with the accompanying drawings in which.

DETAILED DESCRIPTION OF SOME PREFERRED EMBODIMENTS

Figure 1:
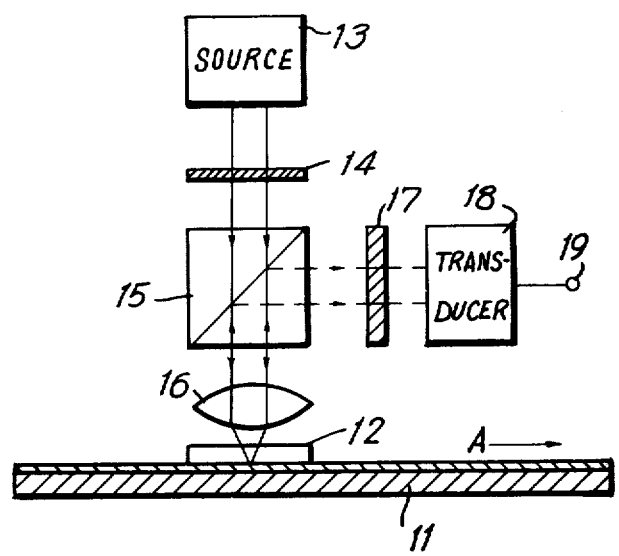
FIG. 1 is a block diagram of one embodiment of a system which includes the pick-up device of the present invention.

Referring now to the drawings, wherein like reference numerals are used throughout, and in particular to FIG. 1, there is illustrated one embodiment of the system in which the pick-up device of the present invention is utilized to read out information which has been recorded on a magnetic medium. The illustrated system employs a photomagnetic technique which relies upon the Faraday effect for optically reading out the magnetically recorded information. For the purpose of the present discussion, it will be assumed that the magnetic medium upon which the information is recorded is a magnetic tape 11 formed of a magnetic layer supported by a support layer, as is conventional. It will be appreciated that the information which is recorded on magnetic tape 11 can be read therefrom either when this tape is stationary or when this tape is moved, for example, in the direction indicated by the arrow A. As a further example, it will be assumed that the information which is recorded on magnetic tape 11 is recorded as a frequency modulated signal. This frequency modulated signal may be an audio signal, a video signal, or the like. As will become apparent from the following description, the information which is recorded on the magnetic tape may be recorded in other conventional formats, such as a pulse code modulated (PCM) signal, a pulse width modulated (PWM) signal, and so on.

The system for optically reading out the information which is magnetically recorded on tape 11 includes a pick-up device 12, a light source 13, a beam-splitter 15 and a photo-transducer 18. Pick-up device 12 is described in greater detail hereinbelow with respect to FIG. 2. Suffice it to say that this pick-up device includes a layer of soft magnetic material whose easy axis is disposed in a direction normal to the plane of the layer which is capable of having magnetic domains generated and propagated therein. When pick-up device 12 is disposed close to or in contact with the surface of magnetic tape 11, the magnetic domains which are included in the layer of magnetic material therein are aligned into patterns corresponding to the patterns of the information which is recorded on the magnetic tape. This will be described in greater detail below.

Light source 13 preferably comprises a laser beam source, such as a He-Ne laser source. A polarizer 14 is positioned in front of light source 13 and is adapted to provide a linear polarization of the laser beam which is emitted by the light source. Beam splitter 15, which may comprise a partially silvered mirror, a Foster-Seely prism, or other conventional beam-splitting element is positioned to receive the polarized laser beam transmitted by polarizer 14, and to transmit this polarized beam toward pick-up device 12. An objective lens 16 is positioned between beam-splitter 15 and pick-up device 12 and is adapted to focus the polarized laser beam onto the pick-up device. As will be described in greater detail below, lens 16 functions to focus the laser beam onto a preselected portion, or layer, included in the pick-up device. The focused beam-spot size obtained by the use of lens 16 preferably is on the order of about 3 $\mu$m.

The focused laser beam is reflected from pick-up device 12 back through lens 16 to beam-splitter 15 whereat it is reflected to transducer 18. A polarizer 17, such as a half-wave plate, is in optical communication with the reflected laser beam so as to change the direction of polarization of the reflected beam relative to the transmitted beam. Transducer 18 is operative to convert changes or modifications in a predetermined parameter of the reflected beam into corresponding electrical changes. For example, transducer 18 may comprise a photodiode, a phototransistor, or other conventional photo-electric converting device for producing electrical modulations corresponding to modulations in the predetermined parameter of the reflected laser beam.

These electrical modulations are supplied to an output terminal 19. As will be explained, if the signal which is magnetically recorded on magnetic tape 11 is a frequency modulated signal, corresponding modulations are detected in the predetermined parameter of the reflected laser beam by transducer 18. This results in a frequency modulated signal supplied to output terminal 19 by the transducer.

Figure 2:
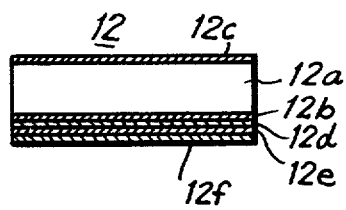
FIG. 2 is a cross-sectional view of one embodiment of the pick-up device of this invention.

Before continuing with the description of the operation of the system shown in FIG. 1, reference is made to FIG. 2 which is a sectional view of one embodiment of pick-up device 12 which is used in the system shown in FIG. 1. This pick-up device is comprised of a substrate 12a formed of a GdGa garnet having a thickness on the order of about 200 $\mu$m to 500 $\mu$m. A layer of soft magnetic material 12b overlies one surface of substrate 12a. The easy axis of this magnetic material is normal to the plane thereof, that is, its easy axis is normal to the surface of substrate 12a upon which the magnetic material is disposed. Both substrate 12a and layer 12b are substantially transparent. Layer 12b has a thickness which is approximately 6 $\mu$m and is made from the YSmCaFeGe system garnet, such as $Y_{1.92}Sm_{0.1}Ca_{0.98}Fe_{4.02}Ge_{0.98}O_{12}$ (garnet). One of ordinary skill in the art will appreciate that the magnetic material constituting layer 12b is capable of having bubble domains generated and propagated therein. However, it should be particularly noted that, in accordance with one aspect of the present invention, pick-up device 12 is used in the absence of a bias field, a bubble transport source and a demagnetizing source which normally are used with so-called bubble-type materials. Hence, magnetic material 12b, which is referred to herein as a bubble material because of its aforementioned capability of having bubbles generated and propagated therein, is free of the usual necessary bubble maintaining, transporting and demagnetizing devices.

Bubble material 12b is magnetically "soft", which means that if this material is placed close to or in contact with magnetic tape 11 upon which signal information is recorded, the magnetically recorded signal does not permanently align the domains within the bubble material in correspondence therewith in accordance with the leakage flux of this magnetically recorded information. Hence, although these domains will be aligned with such magnetically recorded signal information, this alignment can be thought of as being temporary and will exist only so long as bubble material 12b is sufficiently close to or in contact with the magnetically recorded tape. This effect is achieved because the coercivity of the domain wall in bubble material 12b is, at most, 1 oersted. In a preferred embodiment, the coercivity of the domain wall of bubble material 12b is on the order of 0.3 oersted.

On the upper surface of substrate 12a, as viewed in FIG. 2, a layer of non-reflection material 12c is provided. A layer of anti-diffusion material 12d, such as a layer of silicon dioxide($S_iO_2$), having a thickness on the order of about 0.2 $\mu$m, is provided in overlying relation with respect to the bottom surface of the layer of bubble material 12b. A layer of reflection material 12e overlies layer 12d. This reflection material can be formed by depositing a vaporized aluminum film on the layer of anti-diffusion material, this reflection film having a thickness on the order of about 0.3 $\mu$m. The purpose of anti-diffusion layer 12d is to prevent any diffusion between layer 12b of bubble material and layer 12e of reflection material. A layer 12f of protection material overlies layer 12e of reflection material. This protection layer, which may be formed of silicon dioxide, has a thickness on the order of about 0.5 μm and is provided for the purpose of preventing deterioration of reflection layer 12e which may be caused by prolonged use of pick-up device 12. As is appreciated, protection layer 12f is adapted to be placed into contact with the upper surface of magnetic tape 11.

When pick-up device 12, shown in FIG. 2, is used in the system illustrated in FIG. 1, the polarized laser beam which is transmitted from source 13, through polarizer 14 and beam-splitter 15, and focused by lens 16, passes through non-reflection layer 12c, through substrate 12a and through bubble material 12b to be focused upon reflection layer 12d. That is, the size of the focused beam spot impinging upon reflection layer 12d is about 3 μm in diameter. This focused beam is reflected from reflection layer 12d back through bubble material 12b, through substrate 12a and through non-reflection layer 12c. This reflected beam is further transmitted through lens 16 to be reflected by beam-splitter 15 through polarizer 17 to transducer 18. In accordance with the known Faraday effect, the polarization of the laser beam which is transmitted from source 13 through bubble material 12b is subjected to an angular rotation as a function of the pattern in which the magnetic domains within the bubble material are aligned. When the laser beam is reflected back through bubble material 12b from reflection layer 12e, this angular rotation in the polarization of the laser beam is rotated still further, again as a function of the pattern of the magnetic domains. Thus, the laser beam which is reflected to transducer 18 undergoes a relatively substantial change in the polarization thereof due to the pattern of the domains in bubble material 12b. This change in the polarization relative to the polarization of the laser beam emitted by source 13 is detected and converted by transducer 18 to a corresponding electrical signal. As an example, if the signal information which is recorded on magnetic tape 11 is recorded as a frequency modulated signal, then the domains in bubble material 12b will be aligned in correspondence with this frequency modulated signal. More specifically, the domains will appear as a pattern of stripe domains whose width and spacing correspond to the magnetically recorded frequency modulated signal. Consequently, the electrical signal supplied to output terminal 19 by transducer 18 likewise will be a corresponding frequency modulated signal.

Figure 3:
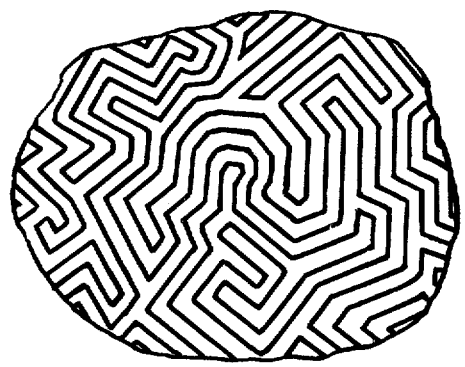
FIG. 3 is an illustration of the quiescent domain patterns of the magnetic material which is used in the pick-up device of this invention.
Figure 4:
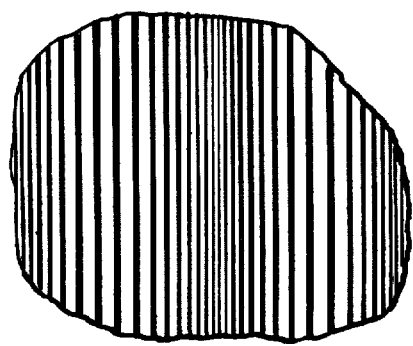
FIG. 4 is an illustration of the arrangement of the signal domain patterns which are formed in the pick-up device when used to read out magnetically recorded information.

Referring to FIG. 3, there is illustrated a maze pattern of the domains within bubble material 12b in the absence of an external magnetic field. That is, when pick-up device 12 is sufficiently far from magnetic tape 11 so as to be unfluenced by the leakage flux from the magnetically recorded signals on the tape, the domains in bubble material 12b are disposed in the illustrated maze pattern. However, when the pick-up device is brought close to, or into contact with, magnetic tape 11, the maze pattern of domains (as shown in FIG. 3) is influenced by the leakage magnetic field from the magnetic tape. It is assumed herein that this leakage magnetic field is produced by, and thus corresponds to, the recorded frequency modulated signal. Hence, and as shown in FIG. 4, this leakage field aligns the domains in bubble material 12b in a corresponding frequency modulated stripe-like pattern. FIG. 4 is an actual representation of the domain pattern which is formed in bubble material 12b when the recorded frequency modulated signal has a carrier frequency of 15 KHz which is frequency modulated by a frequency of 1 KHz.

Figure 5:
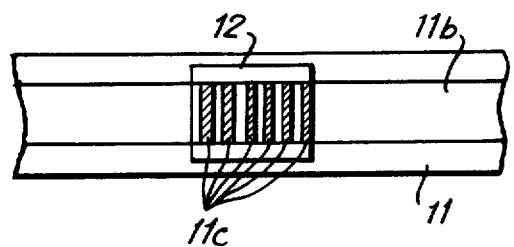
FIG. 5 is a schematic representation of the use of the pick-up device for reading out magnetically recorded information.

FIG. 5 represents the use of pick-up device 12 to read out the magnetically recorded signals from a signal track 11b recorded on magnetic tape 11. With the assumption that the recorded signal information is in frequency modulated format, FIG. 5 represents the domain pattern 11c in which the domains of bubble material 12b are aligned under the influence of the leakage field generated by the magnetically recorded signal. As may be appreciated, since lens 16 focuses the laser beam to a spot having a diameter of 3 μm, the width of track 11b can be made extremely narrow. As tape 11 is moved in the direction of arrow A (FIG. 1), the domain pattern 11c which is induced in bubble material 12b changes as a function of the changing magnetic patterns in the tape. Alternatively, tape 11 can remain fixed and pick-up device 12 can be moved to scan track 11b. For ease of fabrication, the width of pick-up device 12 can be made larger than the width of track 11b. In that event, it is appreciated that the domains within bubble material 12b will be aligned in correspondence with the magnetic patterns which are present in magnetic tape 11 juxtaposed therewith. However, since the size of the beam which is used to read out the patterns of the magnetic domains in bubble material 12b is very narrow, this beam will not be influenced by those domains which are adjacent the track being scanned. Hence, the electrical signal which is produced by transducer 18 will not be degraded by the signals which are recorded in adjacent tracks on magnetic tape 11.

Thus, when the domain patterns shown in FIGS. 4 and 5 are induced in bubble material 12b, it is appreciated that the polarization of the laser beam reflected to transducer 18 will be rotated in a first direction due to, for example, the light stripe domain patterns, and will be rotated in an opposite direction in response to the dark stripe domain patterns. The frequency at which this rotation of the beam polarization is attained corresponds to the frequency modulation of the recorded signal. Transducer 18 detects these angular rotations in the polarization of the reflected laser beam.

The magnetic field $H_\lambda$ generated by the information which is recorded on magnetic tape 11 is dependent upon the wavelength $\lambda_S$ of the recorded signal. In order to align the domains in bubble material 12b from the maze pattern shown in FIG. 3 to the stripe pattern shown in FIG. 4, the magnetic field $H_\lambda$ is determined by the domain energy when the domains exhibit the maze pattern and the domain energy when the domains exhibit the stripe pattern. The latter domain energy is, in general, a function of the configuration, distribution and wavelength of the domains in the stripe pattern. For the present discussion, it will be assumed, in the interest of simplification, that the stripe pattern of the domains is formed of infinitely long stripe domains. This assumption is accurate when it is realized that, in a practical magnetic recording, such as an audio signal recorded on magnetic tape, the wavelength of the recorded signal is about 10 μm while the record track is about 1 mm. This track width is so wide as to induce a stripe pattern of domains in bubble material 12b wherein each stripe domain can be considered to be of infinite length.

The energy density F per unit surface of a stripe pattern of domains wherein each stripe domain is considered to be of infinite length has been found by Malek and Kambersky, in Czechoslovakia Journal of Physics, No. 8, page 416 (1958) as:

$$F = \frac{16I_S^2 d}{\pi^2} \sum_n \frac{1}{n^3}(1 - e^{-n\pi h/d}) + \frac{\sigma_w h}{d} \quad (1)$$

where $I_S$ is the spontaneous magnetization (e.g. the saturation magnetization) of a domain, d is the width of a domain stripe, $\delta_w$ is the energy density of a domain wall, h is the thickness of bubble material 12b, and n is an odd integer in the Fourier expansion of the step function which defines the distribution of magnetization of the stripe pattern of domains.

If the wavelength $\lambda_S$ of the signal recorded on magnetic tape 11 is equal to the period of the stripe pattern of the domains in bubble material 12b, then $$\lambda_S = 2d \ldots \quad (2)$$

If $\lambda_S/2$ is substituted for d in equation (1), then the energy density of the domains in the stripe pattern as a function of the wavelength of the recorded signal is derived.

Let it be assumed that, in a typical bubble material, the spontaneous magnetization $I_S$, the thickness of the bubble material h and the energy density of the domain wall $\delta_w$ have the characteristics:

$I_S = 10.0$ emu/cm$^3$, $h = 6.72$ μm, $\delta_w = 7.81 \times 10^{-2}$ erg/cm$^2$.

Figure 6:
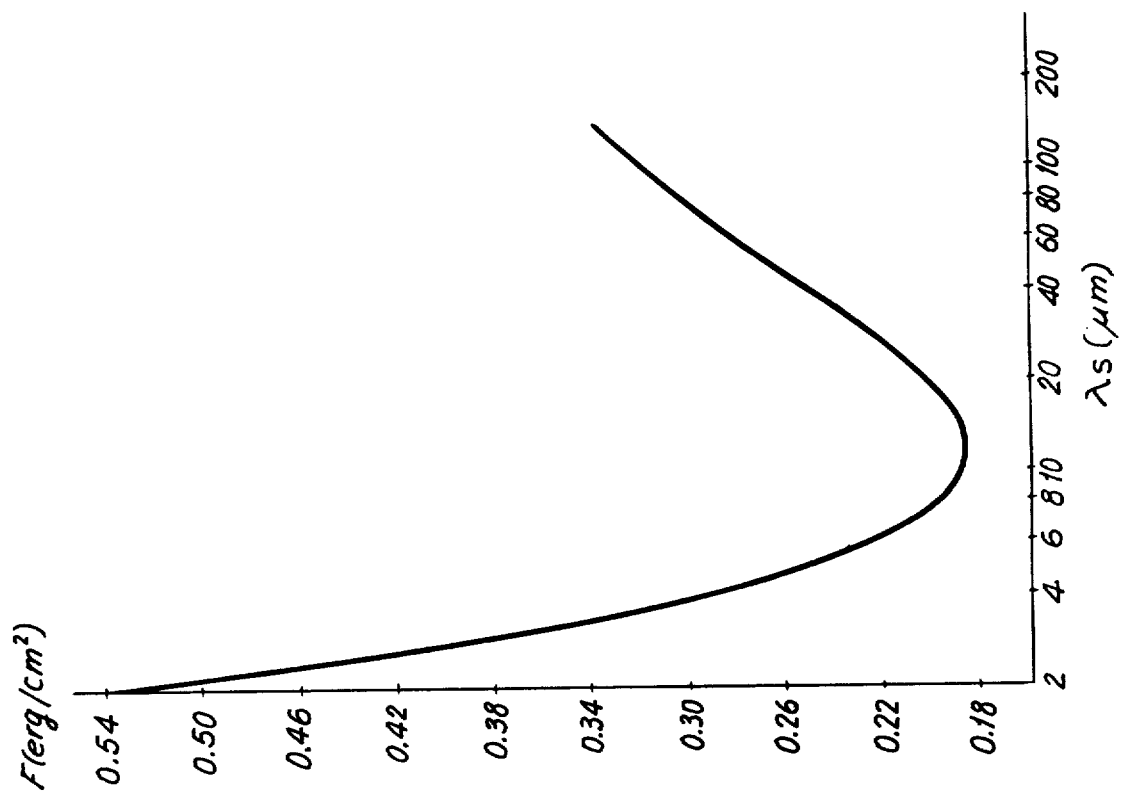
FIG. 6 is a graphical representation of the energy of the induced signal domains as a function of the wavelength of the magnetically recorded information.

When these characteristics are substituted into equation (1), the relationship between the energy density of the domains in the stripe pattern and the wavelength of the recorded signal is graphically represented as shown in FIG. 6. From this graphical representation, it is seen that the minimum energy density $F_o$ is equal to 0.185 erg/cm$^2$ at a wavelength $\lambda_{so}$ of 11.8 μm for the signal recorded on magnetic tape 11. This wavelength ($\lambda_{so} = 11.8$ μm) corresponding to the minimum evergy density $F_o$ can be used in equation (2) to obtain the width of the domain when the domains exhibit the maze pattern. Thus, the width of this maze-pattern domain for this bubble material is 5.90 μm. The energy gain per unit area in bubble material 12b by the exertion of an alternating magnetic field Hλ with its intensity distribution of rectangular like a step function and with its period of $\lambda_s$ is given as: $I_s \cdot H\lambda \cdot h$.

This energy gain is equivalent to the increase in the evergy density of the domains from the maze domain energy $F_o$ to the signal domain energy $F(\lambda_s)$. Thus, one obtains the relation as $$F(\lambda_s) - F_o = I_s \cdot H\lambda \cdot h, \quad (3)$$

then, $$H\lambda = (F(\lambda_s) - F_o)/I_s h. \quad (4)$$

Figure 7:
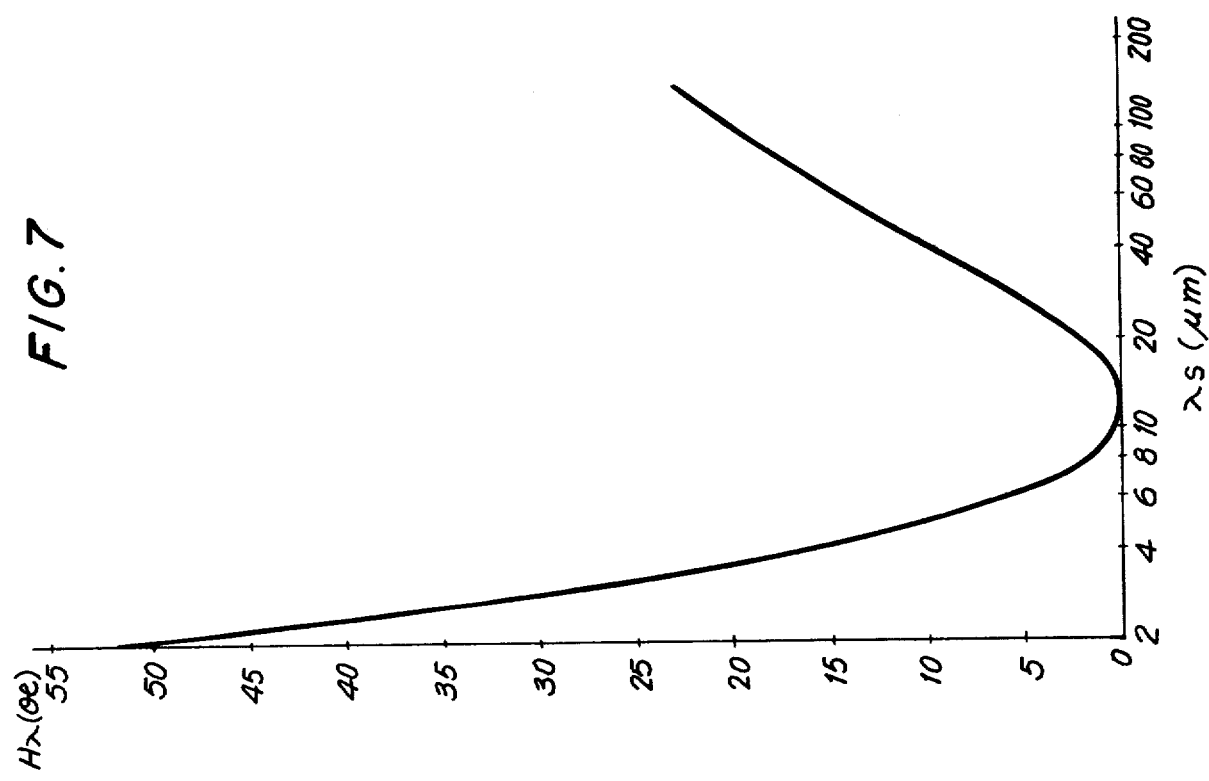
FIG. 7 is a graphical representation of the magnetic field of the induced signal domains as a function of the wavelength of the recorded information.

The graphical representation of FIG. 7 shows how much the intensity of the field is necessary to produce the signal domains with wavelength of $\lambda_s$ in the material mensioned above. If $\lambda_s$ takes a value of 11.8 microns, which is equal to twice of the width of the maze domain, the alternating magnetic field Hλ is equal to zero. However, in practice, rearrangement from the maze domain pattern to the stripe domain pattern with $\lambda_{so}$ requires some amount of alternating fields, which is equal to at least the wall coercivity $H_{cw}$. As mention above, the wall coercivity is extremely small, of the order of about 0.3 oersted. Hence, equation (4) or the graphical reprentation in FIG. 7 is close approximations. By the way, the leakage field from the signals recorded on a magnetic tape has a waveform like a sinusoidal but like rectangular as assumed for derivations of equation (3). This discrepancy would requires some corrections for the obtained from eq(4) amplitudes of the alternating field, which may lead to the average field of (2/π) time to the amplitude of the sinusoidal leakage field.

It is well known that the magnetic field generated by a domain in bubble material 12b is equal to $4\pi I_s$ oersteds. Thus, even if the signal which is recorded on magnetic tape 11 generates a magnetic field which is too weak to be reproduced by the aforementioned magnetic heads of prior art designs, this weak magnetic field will align domains into the signal pattern domains in bubble material 12b, when the wavelength of the signal is near to $\lambda_{so}$. This means that each domain corresponding to the signal pattern generates the magnetic field of $4\pi I_s$ oersteds which can be easily detected by the pick-up device.

From equation (2) and FIG. 7 it is seen that if the magnetically recorded signal having the shorter wavelength is reproduced, the bubble material which constitutes layer 12b should be selected from the material having the narrower width d of the domain stripe.

When pick-up device 12 is constructed as aforesaid, and particularly when bubble material 12b exhibits the particular characteristics described above, the width of the recording track on magnetic tape 11 can be made extremely narrow, approximately 1/100 of the width of a conventional recording track in audio recorders. Hence, the recording density may be significantly improved. As mentioned above, the diameter of the focused light spot, which appears to limit the smallest width of the recording track, can be on the order of about 3 μm. Even if this focused spot diameter varies in the region of a signal domain, it does not deleteriously influence the signal-to-noise ratio of the signals which are reproduced by transducer 18. Furthermore, since the easy axis of this material is normal to the plane thereof, the angular rotation of the polarization of t-e laser beam which is transmitted parallel to the axis through layer 12b is most effective. This angular rotation is on the order of 1° or more. Also, since layer 12e of reflection material reflects the laser beam back through bubble material 12b, this angular rotation of the polarization of the laser beam is doubled. Consequently, transducer 18 can sense this overall angular rotation easily so as to reproduce the recorded signals with high signal-to-noise ratio.

FIGS. 4 and 5 represent that the signal information which is recorded on magnetic tape 11 is a frequency modulated signal. If the magnetically recorded signal is a pulse signal, such as a PCM, PWM, or other pulse signal, the domains in bubble material 12b will be aligned in a pattern corresponding to these pulse signals in a manner similar to that described above. These domain patterns are detected by sensing the angular rotation of the polarization of the laser beam which is transmitted from source 13 through pick-up device 12 and then reflected therefrom to transducer 18.

Figure 8:
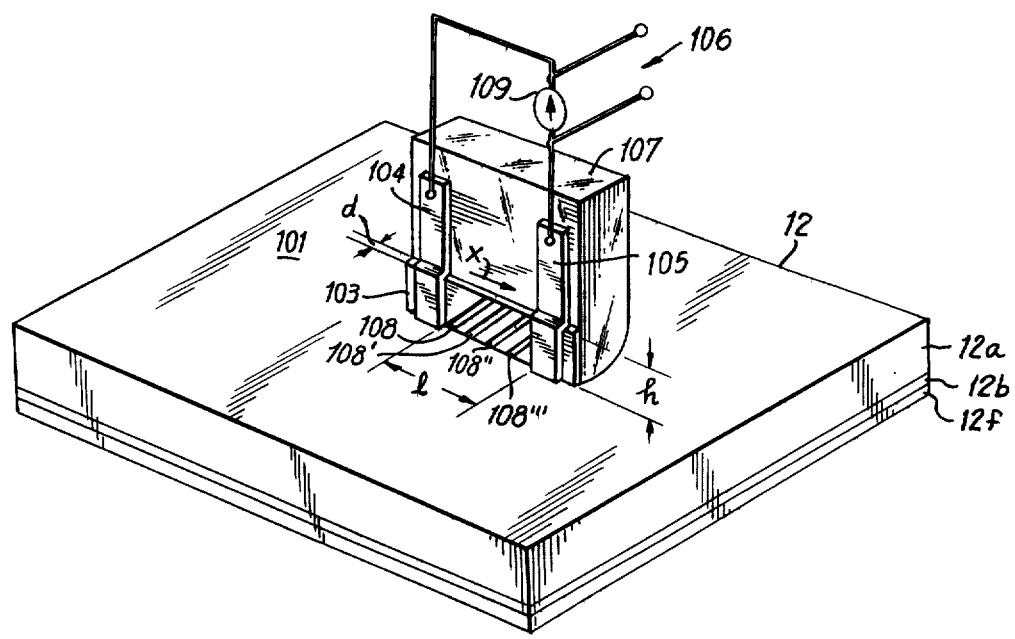
FIG. 8 is a perspective view of another embodiment of the pick-up device in accordance with this invention.

FIG. 1 represents one embodiment of a system wherein pick-up device 12 is employed. In this system, the Faraday effect is relied upon to read out the pattern in which the domains in bubble material 12b are aligned. These domain patterns alternatively can be read by using a magnetoresistive element, or a Hall-effect element. FIG. 8 is a perspective view of another embodiment of pick-up device 12 used in combination with a magnetoresistive element for reading out the domain patterns produced in bubble material 12b.

In the embodiment shown in FIG. 8, a light beam is not transmitted through pick-up device 12. Hence, various portions of the pick-up device shown in FIG. 2 can be omitted. For example, non-reflection layer 12c, light-reflective layer 12e and non-diffusion layer 12d all can be omitted. In FIG. 8, pick-up device 12 is comprised of substrate 12a, a layer of bubble material 12b overlying the lower surface of the substrate, as viewed in FIG. 8, and protection layer 12f overlying the lower surface of bubble material 12b. Substrate 12a, bubble material 12b and protection layer 12f all may be similar to the aforedescribed substrate, bubble material and protection layer. Thus, as before, depending upon the magnetic field Hλ generated by a magnetic medium having signal information recorded thereon, the domains in bubble material 12b may be aligned in a corresponding pattern. This pattern is detected by a magnetoresistive head 101.

In the embodiment shown in FIG. 8, magnetoresistive head 101 is adapted to have the resistance thereof determined as a function of the pattern of domains in bubble material 12b. This magnetoresistive head is similar to the magnetoresistive head described in U.S. Pat. No. 4,052,748. As an alternative, magnetoresistive head 101 may be of the type described in U.S. Pat. No. 3,969,769.

The magnetoresistive head illustrated in FIG. 8 is comprised of a magnetoresistive element 103 which is electrically coupled to a reading circuit 106 (not shown), externally disposed of the magnetoresistive head, via contacts 104 and 105. Magnetoresistive element 103, together with contacts 104 and 105, are provided on a substrate 107, which may be made of glass, by means of methods used in the manufacture of integrated circuits. Magnetoresistive element 103 consists of Ni-Fe alloy; and contacts 104 and 105 are formed by vapor-deposited strips of gold. A number of thin gold strips 108, 108', 108'', . . . are provided on element 103 at an angle of 45° with respect to the longitudinal axis of element 103.

Depending upon the magnetic field generated by the domains in bubble material 12b, that is, depending upon the patterns in which these domains are aligned, the resistance of each of the Ni-Fe paths established by strips 108, 108', . . . will decrease or increase. Hence, the voltage drop across element 103 due to the current supplied thereto by current source 109 provides a measurement of this resistance and, therefore, a representation of the pattern in which the domains are aligned in response to the signal recorded on magnetic medium 11.

In the embodiment shown in FIG. 8, it is preferred that the thickness of substrate 12a be as thin as possible so that the magnetic field generated by the domains in bubble material 12b will have a maximum effect upon the resistance of magnetoresistive element 103.

While the present invention has been particularly shown and described with reference to certain preferred embodiments and applications, it should be readily apparent that various changes and modifications in form and details can be made without departing from the spirit and scope of the invention. An important aspect of this invention is that the domains in bubble material 12b are aligned in accordance with the signal pattern which is recorded on magnetic medium 11 without the necessity of a biasing magnetic field for maintaining such domains, a domain transport source and a demagnetizing source, all as heretofore required by other proposed read-out devices. Hence, the pick-up device of the present invention exhibits a simplified, and thus inexpensive, construction.

What is claimed is:

1. A pick-up device for reading out information which has been recorded as a patterned magnetic field on a magnetic recording medium, comprising:
   a substrate;
   a layer of soft magnetic material overlying a surface of said substrate, said magnetic material having an easy axis of magnetization normal to said surface and being of the type of magnetic material in which magnetic bubble domains can be generated and propagated in the presence of a bias magnetic field, and in which magnetic domains align themselves in a maze pattern in the absence of an applied magnetic field, said magnetic material having a magnetic wall coercivity which is sufficiently low so that, in the absence of said patterned magnetic field, said magnetic domains align themselves in said maze pattern, and, in the presenc of said patterned magnetic field, said maze pattern easily changes to a signal pattern corresponding to that of said patterned magnetic field so as to read the information that has been recorded on said magnetic recording medium;
   and means for sensing said signal pattern and providing a corresponding electrical output.

2. The pick-up device of claim 1 wherein said layer of magnetic material is epitaxially grown on said surface of said substrate.

3. The pick-up device of claim 2 wherein said magnetic material is formed of YSmCaFeGe garnets.

4. The pick-up device of claim 3 wherein said magnetic material is formed of the materials system $Y_{1.92}SM_{0.1}Ca_{0.98}Fe_{4.02}Ge_{0.9}O_{12}$ (garnet).

5. The pick-up device of claim 2 wherein said magnetic material has domain walls having a coercivity on the order of 0.3 oersteds.

6. The pick-up device of claim 1 wherein said substrate is formed of GdGa garnet.

7. The pick-up device of claim 1 wherein said means for sensing includes a magnetoresistive head disposed upon another surface of said substrate, said magnetoresistive head being separated from said layer of magnetic material by at least the thickness of said substrate.

8. The pick-up device of claim 1 further comprising a protection layer overlying said layer of magnetic material, said protection layer being separated from said substrate by said layer of magnetic material.

9. The pick-up device of claim 8 wherein said protection layer is formed of $SiO_2$.

10. The pick-up device of claim 1 wherein said substrate and said layer of magnetic material are light-transmissive, and further comprising a layer of light-reflective material overlying said layer of magnetic material so that said means for sensing is able to optically sense said signal pattern, whereby light impinging upon said pick-up device passes in a first direction through said layer of magnetic material, is reflected by said light reflective material, and then passed through said layer of magnetic material in a second direction.

11. The pick-up device of claim 10 further comprising a layer of anti-diffusion material between said layer of magnetic material and said layer of light-reflective material.

12. The pick-up device of claim 11 wherein said layer of anti-diffusion material is a layer of $SiO_2$.

13. The pick-up device of claim 10 further comprising a non-reflecting transparent coating on the surface of said substrate remote from the surface overlayed by said layer of magnetic material.

14. The pick-up device of claim 10 further comprising a protection layer overlying said layer of light-reflective material.

15. The pick-up device of claim 14 wherein said protection layer is formed of $SiO_2$.

16. The pick-up device of claim 1 wherein the thickness of said layer of magnetic material is on the order of 6 μm.

17. The pick-up device of claim 16 wherein the thickness of said substrate is on the order of 200 μm to 500 μm.

18. The pick-up device of claim 8 wherein the thickness of said protection layer is on the order of 0.5 μm.

19. The pick-up device of claim 10 wherein the thickness of said layer of light-reflective material is on the order of 0.3 μm.

20. The pick-up device of claim 11 wherein the thickness of said layer of anti-diffusion material is on the order of 0.2 μm.

21. A method of optically reading out information recorded as a patterned magnetic field on a magnetic recording medium, comprising the steps of:

scanning the surface of said magnetic recording medium with a pick-up device comprised of a substrate, a layer of soft magnetic material overlying said substrate and a layer of light-reflective material overlying said magnetic material, said magnetic material having an easy axis of magnetization normal to its surface and being of the type of magnetic material capable of having magnetic bubble domains generated and propagated therein in the presence of a bias magnetic field and further being of the type having magnetic domains which align themselves in a maze pattern in the absence of an applied magnetic field, said scanning of the surface of said magnetic recording medium including the step of passing said magnetic material through said patterned magnetic field and the step of maintaining the total magnetic field acting on said magnetic material at a low enough level so that, in the absence of said patterned magnetic field produced by said magnetic recording medium, said magnetic domains align themselves in said maze pattern and further so that, in the presence of the patterned magnetic field produced by said magnetic recording medium, said maze pattern easily changes to a signal pattern corresponding to said patterned magnetic field and moving relative to said layer of magnetic material in accordance with the scanning of the recording material by said pick-up device;

directing a beam of linearly polarized light through said pick-up device toward said magnetic material such that said light beam is transmitted through said substrate and said layer of magnetic material and is reflected by said layer of light-reflective material back through said pick-up device; and detecting the plane of polarization of said reflected light beam relative to that of said transmitted light beam as an indication of the alignment of the magnetic domains in said signal pattern and thus of the information recorded as said patterned magnetic field on said magnetic recording medium.

22. The method of claim 21 further comprising the step of focusing said beam of linearly polarized light onto said layer of light reflective material.

23. The method of claim 22 wherein said light beam is a laser beam.

24. Apparatus for optically reading information recorded as a patterned magnetic field on a magnetic recording medium, comprising a pick-up device positioned proximately of said magnetic recording medium and including a substrate, a layer of soft magnetic material overlying said substrate, and a layer of light reflective material overlying said magnetic material, and magnetic material having an easy axis of magnetization normal to its surface and being of the type of magnetic material capable of having magnetic bubble domains generated and propagated therein in the presence of a bias magnetic field and further being of the type having magnetic domains which align themselves in a maze pattern in the absence of an applied magnetic field, and said pick-up device being constructed so that the total magnetic field acting on said magnetic layer is sufficiently low so that, in the absence of said patterned magnetic field produced by said magnetic recording medium, said magnetic domains align themselves in said maze pattern, whereas, in the presence of said patterned magnetic field produced by said magnetic recording medium, said maze pattern easily changes to a signal pattern corresponding to said patterned magnetic field; a source of light for transmitting a beam of linearly polarized light through said pick-up device, said light beam being reflected by said layer of light-reflective material, so that light beam passes through said magnetic layer twice; and detecting means for receiving the reflected light beam from said pick-up device to detect the plane of polarization of said reflected light beam relative to that of said transmitted light beam, as an indication of the alignment of the magnetic domains in said signal pattern and thus of the information recorded as said patterned magnetic field on said magnetic recording medium.

25. The system of claim 24 wherein said source of light further includes a laser source for transmitting a laser light beam.

26. The system of claim 25 wherein said source of light further includes lens means for focusing said laser light beam onto said layer of light-reflective material of said pick-up device.

27. The system of claim 26 wherein said magnetically recorded signals are recorded in record tracks in said magnetic recording medium.

28. The system of claim 26 wherein said polarized laser light beam undergoes a first angular rotation in the polarization thereof when transmitted through said layer of magnetic material and a second angular rotation in the polarization thereof when reflected through said layer of magnetic material.

* * * * *